United States Patent
George et al.

(10) Patent No.: US 7,898,746 B2
(45) Date of Patent: Mar. 1, 2011

(54) EXTENDED DEPTH-OF-FIELD LENSES AND METHODS FOR THEIR DESIGN, OPTIMIZATION AND MANUFACTURING

(75) Inventors: Nicholas George, Pittsford, NY (US); Xi Chen, San Jose, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 186 days.

(21) Appl. No.: 12/167,741

(22) Filed: Jul. 3, 2008

(65) Prior Publication Data

US 2010/0002310 A1 Jan. 7, 2010

(51) Int. Cl.
*G02B 13/18* (2006.01)
*G02B 3/02* (2006.01)
*G02B 3/10* (2006.01)

(52) U.S. Cl. .................. 359/708; 359/721
(58) Field of Classification Search .......... 359/708, 359/712, 721, 724, 741–742
See application file for complete search history.

(56) References Cited

U.S. PATENT DOCUMENTS

| | | | |
|---|---|---|---|
| 5,438,366 | A | 8/1995 | Jackson et al. |
| 6,927,922 | B2 * | 8/2005 | George et al. .......... 359/708 |
| 7,180,673 | B2 | 2/2007 | Dowski, Jr. |
| 7,218,448 | B1 | 5/2007 | Cathey, Jr. et al. |
| 2003/0127584 | A1 * | 7/2003 | Dowski et al. .......... 250/216 |
| 2005/0275953 | A1 | 12/2005 | George et al. |
| 2006/0050409 | A1 | 3/2006 | George et al. |
| 2006/0082882 | A1 | 4/2006 | Wang et al. |

OTHER PUBLICATIONS

George et al.; Extended Depth of Field Using the Logarithmic Asphere; 19th Congress of the International Commission for Optics; Optics for the Quality of Life, Giancarlo C. Righini, Anna Consortini, Editors; SPIE vol. 4829 (2003); 274-275.
Flores et al.; Achromatic Hybrid Refractive-Diffractive Lens with Extended Depth of Focus; Applied Optics; vol. 43, No. 30; Oct. 20, 2004; 5618-5630.
Chi et al.; Computational Imaging with the Logarithmic Asphere: Theory; J.Opt. Soc. Am.A/vol. 20, No. 12/Dec. 2003; 2260-2273.

(Continued)

*Primary Examiner*—Alicia M Harrington
(74) *Attorney, Agent, or Firm*—Kramer Levin Naftalis & Frankel LLP

(57) ABSTRACT

For rotationally symmetric aspheric lenses, one can establish lens design and layout based upon the phase delay function $\exp[-i\phi(\rho)]$. An embodiment of the invention is a method for calculating a corresponding variation in focal length denoted by $f(\rho)$. According to an aspect, one can also assert a shape for the focal length $f(\rho)$ and thereafter calculate a phase delay function in order to synthesize a novel lens. New EDoF lens designs are obtained by selection of an inner and outer focal length connected by a simple curve that can be approximate by a polynomial. From the selected $f(\rho)$, one can synthesize a finished EDoF lens design and fabricate the lens. Another aspect of this invention is directed to a method to tailor prior-art EDoF lenses so that their performance over some range is improved.

27 Claims, 19 Drawing Sheets

OTHER PUBLICATIONS

Sherif et al.; Phase Plate to Extend the Depth of Field of Incoherent Hybrid Imaging Systems; Applied Optics vol. 43, No. 13 May 1, 2004; 2709-2721.

Mikula et al.; Imaging with Extended Focal Depth by Means of Lenses with Radial and Angular Modulation; Optics Express; vol. 15, No. 15; Jul. 23, 2007; 9184-9193.

Bajuk, D.J.; Computer Controlled Generation of Rotationally Symmetric Aspheric Surfaces; Opt. Engre. 15 No. 5, 401 (1976).

Pruss et al.; Testing Aspheres; Opt. Photon, News 19 No. 4, 25 (2008).

Doughty et al.; Microcomputer-Controlled Polishing Machine for Very Smooth and Deep Aspherical Surfaces; Appl. Opt. 26 No. 12, 2421 (1987).

Jones, R.A.; Fabrication of a Large, Thin, Off-Axis Aspheric Mirror; Opt. Eng. 33 No. 12, 4067 (1994).

Schindler et al.; Nanometer Precision (Reactive) Ion Beam Figuring of (Aspherical) Optical Surfaces; Precision Science and Technology for Perfect Spheres; Y. Furukawa et al, Editors; Japan Society for Precision Engineering, Tokyo (1999).

Walker et al.; The Precessions Process for Efficient Production of Aspheric Optics for Large Telescopes and Their Instrumentation; Proc. SPIE 4842 73 (2003).

Hall et al.; New Mold Manufacturing Techniques; Proc. SPIE 5868, 264 (2005).

* cited by examiner

Table 1-2

Strehl Ratios at Different Object Distances

| Object Distance (mm) | 100 | 150 | 204 | 250 | 300 | 650 | 900 | infinity |
|---|---|---|---|---|---|---|---|---|
| Log asphere β design | 0.001 | 0.005 | 0.014 | 0.039 | 0.045 | 0.261 | 0.416 | 0.291 |
| Tailored parabolic EDoF design | 0.003 | 0.019 | 0.067 | 0.087 | 0.227 | 0.338 | 0.338 | 0.291 |

Table 2-2

FWHM of PSFs at Different Object Distances

| Object Distance (mm) | 100 | 150 | 204 | 250 | 300 | 650 | 900 | infinity |
|---|---|---|---|---|---|---|---|---|
| Log Asphere β Design (um) | >38.32 | 14.966 | 6.258 | 3.224 | 4.84 | 2.448 | 1.876 | 1.39 |
| Tailored parabolic EDoF design (um) | 12.492 | 2.676 | 2.652 | 3.706 | 2.202 | 1.6632 | 1.4524 | 1.3928 |

Fig. 2

Table 1-7
Strehl Ratios at Different Object Distances 700-1

| Object Distance (mm) | 100 | 150 | 204 | 250 | 300 | 650 | 900 | infinity |
|---|---|---|---|---|---|---|---|---|
| Strehl ratio for n=2 design | 0.003 | 0.019 | 0.067 | 0.087 | 0.227 | 0.338 | 0.338 | 0.291 |
| Strehl ratio for n=3 design | 0.004 | 0.020 | 0.082 | 0.147 | 0.275 | 0.218 | 0.230 | 0.294 |
| Strehl ratio for n=4 design | 0.003 | 0.018 | 0.094 | 0.167 | 0.297 | 0.146 | 0.171 | 0.294 |

FIG. 7

Table 1-8

FWHM of PSFs at Different Object Distances

| Object Distance (mm) | 100 | 150 | 204 | 250 | 300 | 650 | 900 | infinity |
|---|---|---|---|---|---|---|---|---|
| FWHM of PSF for n=2 design (μm) | 12.492 | 2.676 | 2.652 | 3.706 | 2.202 | 1.6632 | 1.4524 | 1.3928 |
| FWHM of PSF for n=3 design (μm) | 8.318 | 3.012 | 2.872 | 2.86 | 2.148 | 1.4972 | 1.3638 | 1.3942 |
| FWHM of PSF for n=4 design (μm) | 18.842 | 3.208 | 2.774 | 2.734 | 2.096 | 1.4808 | 1.3484 | 1.392 |

FIG. 8

Table 1-10
Strehl Ratios at Different Object Distances

| Object Distance (mm) | 100 | 150 | 204 | 250 | 300 | 650 | 900 | infinity |
|---|---|---|---|---|---|---|---|---|
| Strehl ratio for n=2 design | 0.003 | 0.019 | 0.067 | 0.087 | 0.227 | 0.338 | 0.338 | 0.291 |
| Strehl ratio for n=4 design | 0.003 | 0.018 | 0.094 | 0.167 | 0.297 | 0.146 | 0.171 | 0.294 |
| Strehl ratio for second order optimized design | 0.005 | 0.027 | 0.091 | 0.143 | 0.253 | 0.233 | 0.275 | 0.293 |

Table 2-10
FWHM of PSFs at Different Object Distances

| Object Distance (mm) | 100 | 150 | 204 | 250 | 300 | 650 | 900 | infinity |
|---|---|---|---|---|---|---|---|---|
| FWHM of PSF for n=2 design (μm) | 12.492 | 2.676 | 2.652 | 3.706 | 2.202 | 1.6632 | 1.4524 | 1.3928 |
| FWHM of PSF for n=4 design (μm) | 18.842 | 3.208 | 2.774 | 2.734 | 2.096 | 1.4808 | 1.3484 | 1.392 |
| FWHM of PSF for second order optimized design | 7.266 | 3.02 | 2.902 | 2.844 | 2.108 | 1.510 | 1.3890 | 1.4242 |

FIG. 10

| Surface | Curvature Radius (mm) | Distance (mm) | Conic | Index of Refraction (d line) | Abbe Number |
|---|---|---|---|---|---|
| *s1 | R1: 3.344 | 0.649 | 2.00 | N1: 1.603001 | v1: 65.44 |
| *s2 | R2: 14.526 Aperture Stop | 0.417 | -2.00 | | |
| *s3 | R3: -11.386 | 1.200 | -2.00 | N2: 1.528554 | v2: 76.98 |
| *s4 | R4: -1.591 | 0.249 | -1.72 | | |
| *s5 | R5: -4.611 | 1.214 | -2.00 | N3: 1.846663 | v3: 23.83 |
| *s6 | R6: -13.893 | 1.028 | 1.00 | | |
| s7 | R7: -2.037 | 1.195 | | N4: 1.516800 | v4: 64.17 |
| s8 | R8: 24.599 | 0.280 | | | |
| s9 | R9: ∞ | 0.200 | | N5: 1.516330 | v5: 64.14 |
| s10 | R10: ∞ | 0.286 | | | |

* Even aspheric surfaces

FIG. 11(a)

S1:
$-0.02173\rho^4$, $0.0261\rho^6$, $-0.0644\rho^8$, $0.07256\rho^{10}$, $-0.0293\rho^{12}$, $2.726*10^{-3}\rho^{14}$, $-1.473*10^{-3}\rho^{16}$ S2:
$-5.300*10^{-3}\rho^4$, $0.1043\rho^6$, $-0.2509\rho^8$, $0.3903\rho^{10}$, $-0.2792\rho^{12}$, $0.0664\rho^{14}$, $0.0230\rho^{16}$ S3:
$-0.02532\rho^4$, $0.0702\rho^6$, $-0.133225\rho^8$, $0.140751\rho^{10}$, $-0.051628\rho^{12}$, $7.30433*10^{-3}\rho^{14}$ S4:
$-0.05099\rho^4$, $0.030517\rho^6$, $-0.045136\rho^8$, $0.031513\rho^{10}$, $-9.480439*10^{-3}\rho^{12}$, $1.50614*10^{-3}\rho^{14}$ S5:
$-0.0312\rho^4$, $3.0683*10^{-3}\rho^6$, $2.301*10^{-3}\rho^8$, $-4.9187*10^{-3}\rho^{10}$, $3.358*10^{-3}\rho^{12}$, $-4.975*10^{-4}\rho^{14}$ S6:
$-0.02062\rho^4$, $2.902*10^{-3}\rho^6$, $-1.09*10^{-3}\rho^8$, $1.1575*10^{-3}\rho^{10}$, $-6.575*10^{-4}\rho^{12}$, $1.484*10^{-4}\rho^{14}$

FIG. 11(b)

Table 1-12

Strehl Ratios at Different Object Distances for On-Axis Objects

| Object Distance (mm) | 100 | 150 | 204 | 250 | 300 | 650 | 900 | infinity |
|---|---|---|---|---|---|---|---|---|
| Standard lens | 0.002 | 0.003 | 0.004 | 0.013 | 0.009 | 0.067 | 0.299 | 0.837 |
| Logarithmic asphere β design based on standard lens | 0.002 | 0.007 | 0.023 | 0.036 | 0.077 | 0.266 | 0.377 | 0.290 |
| Tailored parabolic EDoF based on standard lens | 0.003 | 0.017 | 0.071 | 0.148 | 0.238 | 0.258 | 0.293 | 0.296 |

Table 2-12

FWHM of PSFs at Different Object Distances for On-Axis Objects

| Object Distance (mm) | 100 | 150 | 204 | 250 | 300 | 650 | 900 | infinity |
|---|---|---|---|---|---|---|---|---|
| Standard lens (um) | >43.42 | >42.16 | 34.32 | 19.96 | 21.46 | 6.372 | 1.7738 | 1.6162 |
| Logarithmic asphere β design based on standard lens (um) | 32.76 | 6.948 | 4.582 | 4.74 | 3.612 | 2.352 | 1.8628 | 1.342 |
| Tailored parabolic EDoF based on standard lens (um) | 15.410 | 5.864 | 3.492 | 2.76 | 2.218 | 1.622 | 1.4666 | 1.4104 |

FIG. 12

Table 1-15

Strehl Ratios at Different Object Distances

| Object Distance (mm) | 100 | 150 | 204 | 250 | 300 | 650 | 900 | infinity |
|---|---|---|---|---|---|---|---|---|
| Log Asphere β Design | 0.001 | 0.005 | 0.014 | 0.039 | 0.045 | 0.261 | 0.416 | 0.291 |
| Log Asphere β Design Tailored I | 0.002 | 0.008 | 0.044 | 0.069 | 0.150 | 0.214 | 0.258 | 0.292 |
| Log Asphere β Design Tailored II | 0.001 | 0.005 | 0.015 | 0.048 | 0.051 | 0.231 | 0.340 | 0.292 |

Table 2-15

FWHM of PSFs at Different Object Distances

| Object Distance (mm) | 100 | 150 | 204 | 250 | 300 | 650 | 900 | infinity |
|---|---|---|---|---|---|---|---|---|
| Log Asphere β Design (um) | >38.32 | 14.966 | 6.258 | 3.224 | 4.84 | 2.448 | 1.876 | 1.39 |
| Log Asphere β Design Tailored I (um) | 22.52 | 11.126 | 3.436 | 3.772 | 2.726 | 2.046 | 1.629 | 1.338 |
| Log Asphere β Design Tailored II (um) | 35.58 | 15.028 | 6.202 | 2.938 | 4.544 | 2.52 | 1.971 | 1.344 |

FIG. 15

Table 1-18

Strehl Ratios at Different Object Distances

| Object Distance (mm) | 100 | 150 | 204 | 250 | 300 | 650 | 900 | infinity |
|---|---|---|---|---|---|---|---|---|
| Log Asphere γ Design | 0.002 | 0.006 | 0.009 | 0.040 | 0.036 | 0.237 | 0.363 | 0.290 |
| Log Asphere γ Design Tailored I | 0.001 | 0.006 | 0.015 | 0.024 | 0.056 | 0.258 | 0.244 | 0.290 |
| Log Asphere γ Design Tailored II | 0.001 | 0.004 | 0.013 | 0.010 | 0.052 | 0.269 | 0.266 | 0.281 |

Table 2-18

FWHM of PSFs at Different Object Distances

| Object Distance (mm) | 100 | 150 | 204 | 250 | 300 | 650 | 900 | infinity |
|---|---|---|---|---|---|---|---|---|
| Log Asphere γ Design (um) | 1.533 | 31.96 | 28.04 | 1.340 | 14.428 | 1.241 | 1.383 | 2.266 |
| Log Asphere γ Design Tailored I (um) | >36.334 | 34.4 | 27.4 | 1.257 | 1.253 | 1.283 | 1.239 | 1.849 |
| Log Asphere γ Design Tailored II (um) | >36.314 | >35.7 | 29.44 | 25.78 | 1.315 | 1.365 | 1.300 | 1.540 |

FIG. 18

EXTENDED DEPTH-OF-FIELD LENSES AND METHODS FOR THEIR DESIGN, OPTIMIZATION AND MANUFACTURING

TECHNICAL FIELD

Embodiments of the invention are generally related to the field of imaging and optical lens design, optimization and manufacturing. More particularly, embodiments of the invention are directed to aspheric (including multi-focal) and extended depth-of-field (EDOF) lenses (including phase masks); tailored aspheric and extended depth-of-field lenses (T-EDoF); and methods pertaining to the design, optimization, and manufacture of aspheric and extended depth-of-field lenses (including T-EDoF).

DESCRIPTION OF RELATED ART

Lenses used in conventional digital and 35 mm photography cameras can have zoom and focus features that are manual or automated. Generally, these cameras have a limited depth-of-field. With reference to FIG. 1, the classical depth-of-field can be expressed as $$s_2 - s_1 \cong \frac{4\lambda s_0^2}{D^2},$$

where $s_0$, $s_1$, $s_2$ are, respectively, the object focus point, the inner object distance and the outer object distance where blur is just evident to an observer; D is the diameter of the aperture, and $\lambda$ is the average visible wavelength taken as $\lambda=0.55$ μm (micron meters).

Cameras have become commonplace via their incorporation into various devices such as mobile (cell) telephones. Today's cell phone-picture-takers want to take pictures of their friends' faces in the backdrop of distant views and everything in-between, and get sharp, clear results that they can view and send around the world. Current extended depth-of-field cameras limit this ability.

It is well known to purposefully blur an image, record that image, and sometime later with additional processing extend the depth-of-field. Integrated computing and imaging technology has made various improvements in the depth-of-field that can be obtained with a lens focused at a field point $s_0$. These improvements can also be used by cameras that have automatic focus and/or zoom features. One factor that can assist in successfully extending the depth-of-field is maintaining a substantially uniform (i.e., z-axis variant) point-spread-function (PSF) along the optical axis. This allows image processing, e.g., inverse filtering or maximum entropy processing, which both depend on a knowledge of the blurred point-spread-function, to be most effective.

The operation of any lens, n, can be expressed quantitatively by its amplitude transmission function $T_n(\rho)$, defined by $$T_n(\rho) = \frac{U_{out}(\rho)}{U_{in}(\rho)} = e^{-i\phi_n(\rho)}, \quad (1)$$

in which the scalar electric field out is denoted by $U_{out}(\rho)$ and the input scalar electric field is $U_{in}(\rho)$. The function $\phi(\rho)$ is called the phase delay (measured in radians) for the lens. The amplitude transmission function can contain a detailed description of lens performance in terms of wavefronts of the propagating light. A given phase delay function $\phi(\rho)$ can establish a lens description in terms that an optical designer can use and from which the lens can then be fabricated.

The making (i.e., design and, if desired, manufacturing) of an aspheric lens can be a relatively complicated and expensive endeavor. The basis of current technology is timely set forth in the seminal article by D. J. Bajuk, *Computer Controlled Generation of Rotationally Symmetric Aspheric Surfaces*, Opt. Engr. 15 No. 5, 401 (1976). Typically, the design of an asphere is based on deriving a sag height departure from a reference sphere. A skilled optical designer can use knowledge about the sag height to determine the lens transmission function as set forth in Eq. (1) above. Fourier optics techniques provide the mathematical tools for lens system design and layout. Commercially available software has been developed to readily facilitate aspheric lens system design and layout. Making the asphere is greatly facilitated by computer-controlled machinery and, in certain circumstances, by skilled hand labor.

In view of the foregoing, it may be advantageous to have a simplified and less costly approach for designing aspheric lenses and those having extended depth of field (EDoF). It may also be advantageous to be able to simply and efficiently optimize the performance of existing aspheric EDoF lenses/systems.

BRIEF DESCRIPTION OF DRAWINGS

FIG. 2 shows a tabular comparison of a tailored parabolic EDoF lens according to an embodiment of the invention with a prior art EDoF logarithmic asphere in terms of Strehl ratio and the full-width half maximum of the Point Spread Function (PSF), versus object distance.

FIG. 7 shows a comparative table of Strehl ratios for the n=2, 3, 4 lenses represented by the curves in FIG. 6.

FIG. 8 shows a comparative table of PSF-FWHM values for the n=2, 3, 4 lenses represented by the curves in FIG. 6.

FIG. 10 shows a tabular comparison of the tailored parabolic (n=2) EDoF lens, the polynomial tailored (n=4) EDoF lens, and the hyper-optimized tailored EDoF lens, from FIG. 9, according to certain aspects of an embodiment of the present invention with regard to Strehl ratio and the full-width half maximum of the PSF, versus object distance.

FIGS. 11(a), 11(b) show actual lens data for the lens design illustrated in FIG. 4.

FIG. 12 shows tabular comparisons of Strehl ratio and FWHM of PSF vs. object distance between a diffraction limited actual lens, a prior art EDoF β-Logarithmic asphere actual lens, and the tailored parabolic EDoF actual lens as shown in FIG. 4.

FIG. 15 shows tabular comparisons of Strehl ratio and FWHM of PSF vs. object distance of the β-Logarithmic asphere and the two optimization designs depicted in FIG. 13.

FIG. 18 shows tabular comparisons of Strehl ratio and FWHM of PSF vs. object distance of the prior art EDoF γ-Logarithmic asphere and the two embodied optimization designs depicted in FIG. 17.

DETAILED DESCRIPTION

Figure 1:
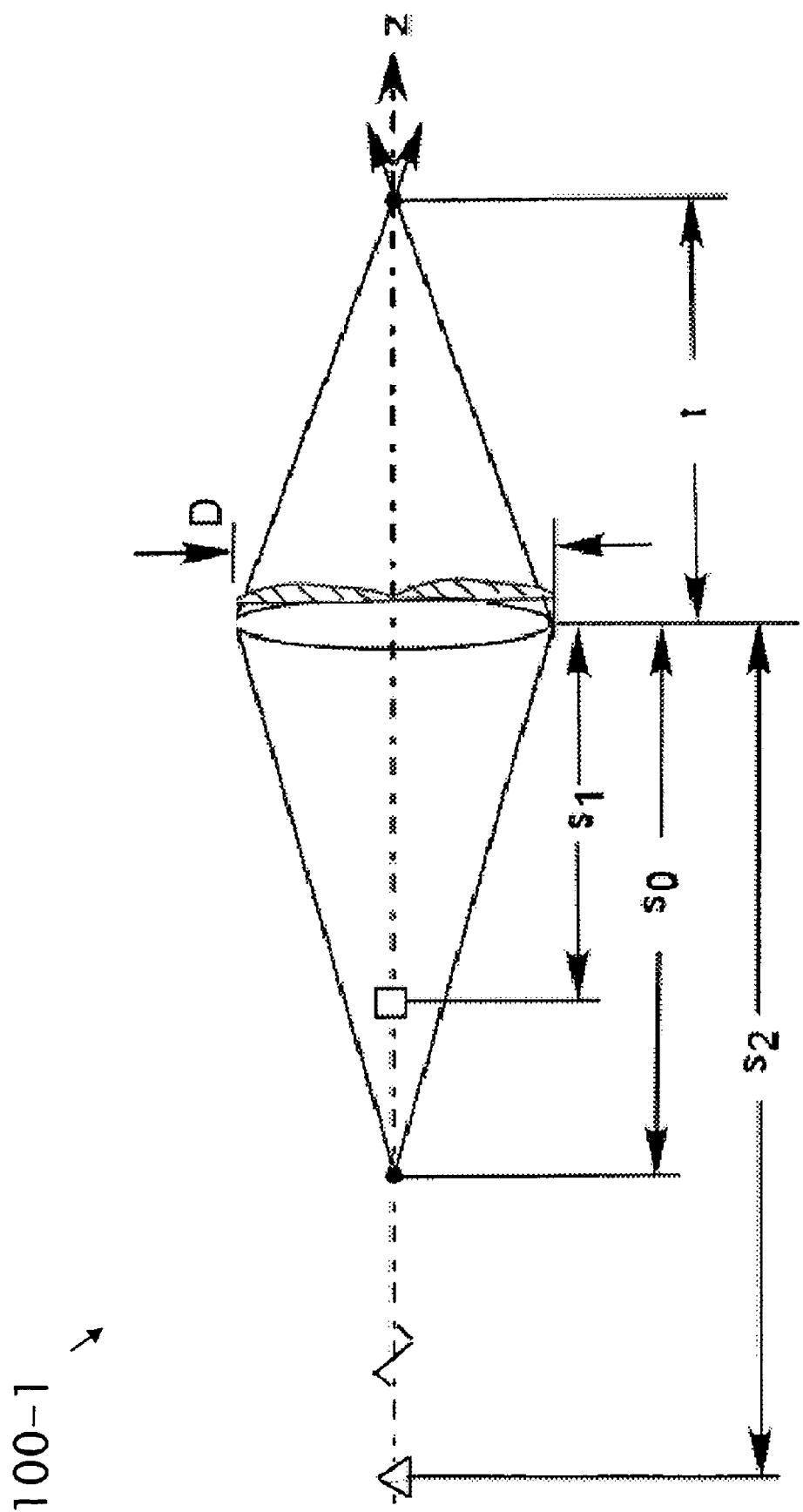
FIG. 1 schematically shows an idealized diffraction-limited lens of focal length F and diameter 2R with an object point at $s_0$ imaged to a detector at t, and a depth of field from inner $s_1$ to outer $s_2$.

Ray optics is an alternate (to physical optics) useful way of describing the operation of a lens in terms of, e.g., its f/#, focal length, f, and diameter, D, which are readily measurable quantities. It would be advantageous to directly associate the description of an EDoF lens in terms of the phase delay for the lens with the ray optics parameters. More particularly, since the intermediate image blur and the EDoF can be controlled by the radial variation of the focal length $f(\rho)$, the ability to associate this ray optics parameter with the conventional Fourier optics tools used by lens designers would be useful.

Further benefits and advantages may be realized by providing new classes of z-axis rotationally or circularly symmetric lenses that can capture a purposefully blurred image as described by a known point spread function and provide an improved output scene after image processing.

The potential benefits and advantages of extending practical lens design for circularly/rotationally symmetric aspheric lenses based upon a knowledge of the phase delay function $\exp[-i\phi(\rho)]$ include, without limitation, the capability to: directly calculate a corresponding variation in focal length denoted by $f(\rho)$; provide a shape for the focal length $f(\rho)$ and thereafter directly calculate a phase delay function in order to conventionally synthesize a lens; specify improved performance EDoF lens designs simply by selection of an inner and outer focal length connected by a simple curve that can be approximated by a polynomial; tailor the prior-art EDoF lenses so that their performance over a specified range can be improved; and use basic physical notions and/or geometric optics to choose an $f(\rho)$ and directly determine the corresponding phase delay $\phi(\rho)$ to design the lens and fabricate it as desired.

An embodiment of the invention is a method for directly determining a focal length $f(\rho)$ of a rotationally symmetric, aspheric lens as a function of lens radius $\rho$ from a known phase delay function $\phi(\rho)$. The phrase 'directly determining' as used herein means that one can simply mathematically determine expressions for $f(\rho)$ and $\phi(\rho)$ from respective, corresponding known expressions for $\phi(\rho)$ and $f(\rho)$, and vice-versa.

Based on Maxwell's equations and, in particular, the Rayleigh-Sommerfeld-Smythe integral form, the following new formula can be used to express the radially varying focal length of a lens $f(\rho)$ in terms of its phase delay $\phi(\rho)$, as follows:

Given the function $\phi(\rho)$, $$f(\rho) = \left[\left(\frac{k\rho}{\phi'(\rho)}\right)^2 - \rho^2\right]^{1/2}. \tag{2}$$

Alternatively, given the focal length $f(\rho)$, $$\phi'(\rho) = \frac{-k\rho}{[f^2(\rho) + \rho^2]^{1/2}}. \tag{3}$$

In these equations $\phi'(\rho) = d\phi(\rho)/d\rho$ is the first derivative of the phase delay function. Equation (3) is simply another form obtained from Eq. (2). The phase delay $\phi(\rho)$ can then be obtained by:

$$\phi(\rho) = \int_0^\rho \phi'(\rho_1) d\rho_1 = \int_0^\rho \frac{-k\rho}{[f^2(\rho_1) + \rho_1^2]^{1/2}} d\rho_1, \tag{4}$$

where $\rho_1$ is the variable of integration running from 0 to $\rho$. Since integration provides a smoothing operation, $f(\rho)$ is not required to have a high degree of precision, thus Eq. (4) can give a stable functional solution for the phase delay function $\phi(\rho)$ of the EDoF lens in accordance with an embodiment of the invention.

The description of an aspheric lens is given by its transmission function, $T(\rho)$, as follows:

$$T(\rho) = e^{-i\phi(\rho)}, \tag{5}$$

in which circular/rotational symmetry is assumed. Based on the phase delay function $\phi(\rho)$, a formula can be derived to directly express the local focal length $f(\rho)$ as a function of the lens radius. The phase term $\phi(\rho)$ in the amplitude transmission function can be expressed as a power series, e.g., given by:

$$\phi(\rho) = -\frac{2\pi}{\lambda_0}\{\alpha_0 + \alpha_2\rho^2 + \alpha_3\rho^3 + \alpha_4\rho^4 + \alpha_5\rho^5 + \alpha_6\rho^6 + \ldots\}, \tag{6}$$

in which the $\alpha$'s are known. Moreover, the quadratic term gives the paraxial focal length as follows:

$$e^{i\frac{2\pi}{\lambda_0}\alpha_2\rho^2} = e^{i\frac{\pi}{\lambda_0 F_0}\rho^2}, \tag{7}$$

in which harmonic time dependence $\exp(i\omega_0 t)$ is implicitly assumed. Hence by Eq. (3), the overall paraxial focal length, $F_0$, is given as $$F_0 = \frac{1}{2\alpha_2}. \tag{8}$$

Figure 5:
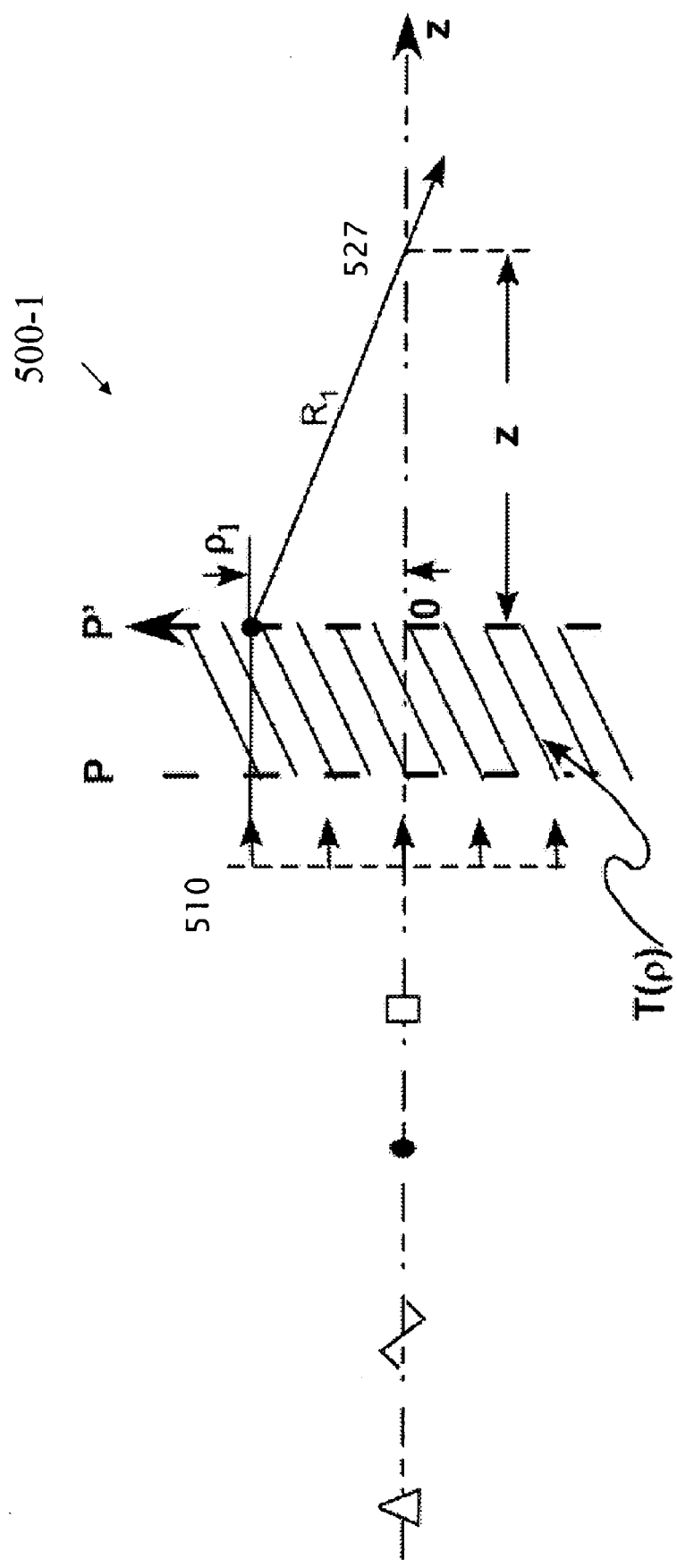
FIG. 5 schematically shows a notation for a lens having a phase delay $\phi(\rho)$ and focal length $f(\rho)$, illustrating a point of stationary phase at $\rho_1$.

According to an embodiment of the invention, an expression for the radial value of the focal length f(ρ) is determined by a local rate of change of ϕ(ρ). For electromagnetic radiation (light) 510 coming through the aperture shown as a principal plane P of the schematic EDoF lens 512 in FIG. 5, the exact solution of Maxwell's equations for a transverse scalar component of the electric field determined by the Rayleigh-Sommerfeld-Smythe solution can be written as:

$$E_y(x, y, z) = \int_{-\infty}^{\infty} \int dx' dy' E_y(x', y', 0) \frac{e^{-ikR_1}}{2\pi R_1} \frac{z}{R_1}\left(ik + \frac{1}{R_1}\right), \quad (9)$$

where the exiting field $E_y (x', y', 0) = T(\rho) \cdot 1$ for a plane wave input. In Eq. (9) and elsewhere, an exp(+iωt) harmonic time dependence notation is used.

For a rotationally symmetric lens, and making standard approximations to eliminate amplitude variations, Eq. (9) can be re-written as follows:

$$E_y(0, 0, z) = A \int d\rho' e^{-i\phi(\rho') - ikR_1}, \quad (10)$$

where $$A = \frac{z}{R_1}\left(ik + \frac{1}{R_1}\right) / (2\pi R_1)$$

has been assumed constant and taken out of the integral as a standard approximation.

Eq. (10) will give rise to a peak value at some axial point z when $E_y(0,0,z)$ takes on a peak value. This represents an axial ray crossing as shown at 527 in FIG. 5 coming from a radial point $\rho_1$. This ray can be found from the principle of stationary phase applied to find an approximate integration of Eq. (10). For the phase term in the integral of Eq. (10) given by $$\phi(\rho') + kR_1 = \phi(\rho') + k[\rho'^2 + z^2]^{1/2}, \quad (11)$$

the point of stationary phase is found by setting the derivative with respect to ρ' equal to zero. This stationary point in the integral over ρ' is denoted as $\rho_1$. Then, $$\phi'(\rho_1) + \frac{k\rho_1}{[f^2(\rho_1) + \rho_1^2]^{1/2}} = 0, \quad (12)$$

in which the axial crossing point at z (527 in FIG. 5) is replaced by $f(\rho_1)$, the result sought. Now, selecting f(ρ) for an asphere to be fabricated, the lens can have a phase delay function ϕ(ρ) given by the integration of Eq. (12), namely:

$$\phi(\rho) = \int_0^\rho \phi'(\rho_1) d\rho_1$$

$$\phi(\rho) = \int_0^\rho \frac{-k\rho}{[f^2(\rho_1) + \rho_1^2]^{1/2}} d\rho_1, \quad (13)$$

as set forth above.

According to another embodiment, via Eq. (12) an assumed or known form for the phase delay of the lens can be used to directly find the value of the radial focal length for the asphere, namely:

$$f(\rho) = \pm\left[\left(\frac{k\rho}{\phi'(\rho)}\right)^2 - \rho^2\right]^{1/2}. \quad (14)$$

This formula can be used to analyze an arbitrary asphere given ϕ'(ρ). The expression for ϕ'(ρ) can be differentiated and used to calculate f(ρ). Typically, the proper choice of sign will be physically obvious.

Another embodiment of the invention is a method of 'tailoring' the design of a previously designed EDoF lens. The term 'tailoring' as used herein includes modifying the prior design of an EDoF lens to obtain improved EDoF performance.

An example of the current embodiment is illustrated and discussed in connection with FIG. 1. An EDoF lens 100-1 having parameters applicable for use in a cell-phone or a miniature digital camera, for example, is specified to operate from $s_1=204.5$ mm to $s_2=\infty$, with D (2R) equal to 1.8 mm and f/# equal to 2.8. An EDoF β-logarithmic asphere can be designed using techniques known in the art. From this design, one skilled in the art can obtain the phase delay function of the logarithmic asphere denoted here by $\phi_L(\rho)$, where the subscript L refers to the logarithmic asphere lens. Using Eq. (2), $f_L(\rho)$ vs. ρ can be calculated as shown by curve 310 in FIG. 3.

Figure 3:
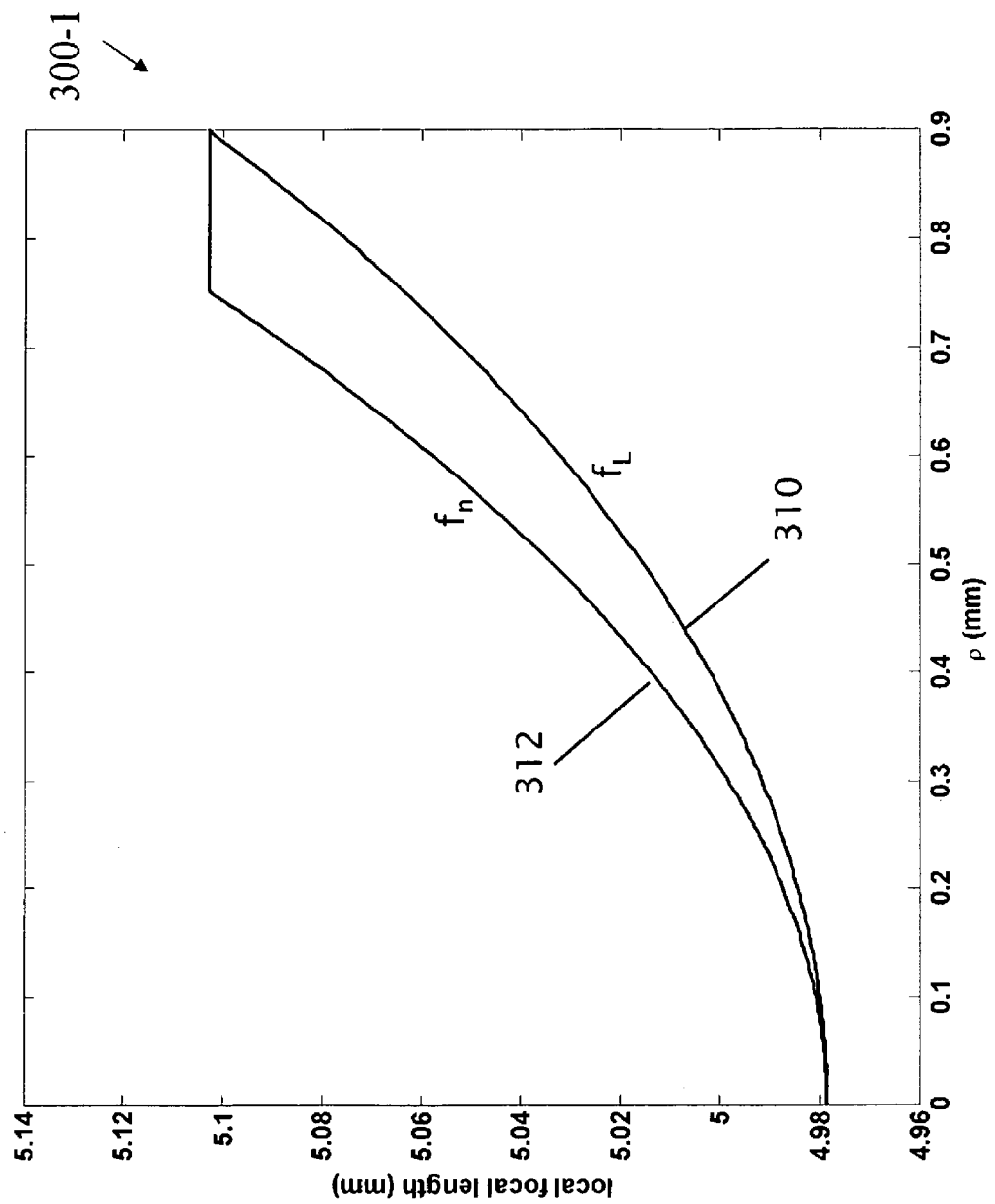
FIG. 3 shows a comparative graph of curves of local focal length as a function of lens radius for a tailored parabolic EDoF lens according to an embodiment of the invention and a prior art EDoF logarithmic asphere.

The tailored EDoF design according to the instant embodiment is obtained by drawing the $f_n(\rho)$ curve 312 in FIG. 3, where the subscript n refers to a 'new' (tailored) parabolic lens. It can be seen that the tailored parabolic lens has the same range of focal lengths, from 4.979 mm to 5.103 mm, as the β-logarithmic asphere lens. Moreover, a simple quadratic curve or parabolic shape is used but with a flat, fixed focal length from $0.75 < \rho \leq 0.9$. The parabolic EDoF design can be summarized with the following equations:

$$f(\rho) = \begin{cases} 4.979 + 0.22\rho^2, & 0 \leq \rho < 0.75 \text{ mm} \\ 5.103 & 0.75 < \rho \leq 0.9 \text{ mm} \end{cases} \quad (15)$$

$$\phi(\rho) = 1146.4\rho^2 - 28.04\rho^4 - 24.52\rho^6 + 24.03\rho^8. \quad (16)$$

This result illustrates the design of the new, tailored EDoF lens according to an embodiment of the invention.

FIG. 2 present a tabular comparison of performance data for the tailored parabolic EDoF lens and the prior-art EDoF βP-logarithmic asphere with regard to Strehl ratio and the full-width half maximum of the Point Spread Function (PSF) versus object distance in mm. As shown in FIG. 2, the Strehl ratio for the tailored parabolic design is higher at all object distances except 900 mm than that for the β-logarithmic asphere. The Strehl ratio is an indicator of image quality particularly at lower light levels. Moreover, the PSF for the tailored parabolic design indicates better performance than for the prior art lens at all distances even as close as 100 mm. Also, with regard to the full-width half maximum of the PSF criterion, the tailored parabolic design outperforms the prior art lens at all distances from 100 mm to infinity except at 250 mm. Thus, the tailored parabolic lens has better EDoF characteristics than the prior art β-logarithmic lens when the overall specifications are identical. Furthermore, the tailored parabolic EDoF lens can provide good performance over a larger axial distance than specified in the design goals.

Figure 4:
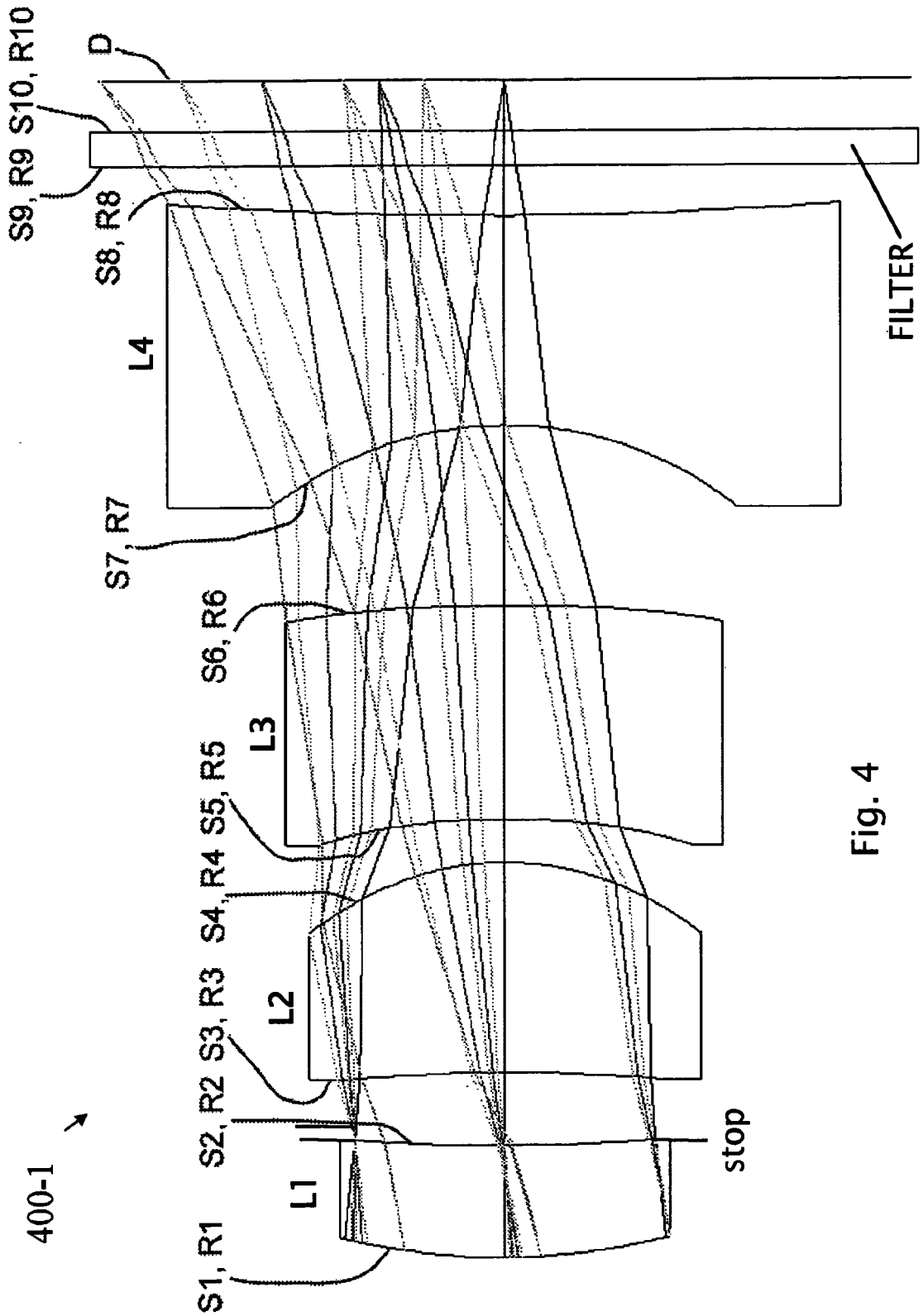
FIG. 4 shows a detailed optical design configuration for a tailored parabolic EDoF lens according to an embodiment of the invention.

The $T_n(\rho)$, f/#, D, and $f_n(\rho)$ values can be used to prepare an optical layout for this tailored lens. FIG. 4 shows the detailed lens layout 400-1 for the design of the tailored EDoF lens described by curve 312 in FIG. 3 for $f_n(\rho)$ vs. $\rho$ and the performance data tabulated in FIG. 2.

It is further noted that the results of the method embodiment disclosed herein above verify the stability of the embodied EDoF design process to small deviations in the shape of the $f(\rho)$ vs. $\rho$ curve. In the process of integrating Eq. (3) to find $\phi(\rho)$, stable solutions for the form of the transmission function $T(\rho)=\exp[-i\phi((\rho)]$ can be obtained.

In regard to this embodiment and others to be presented below, it is important to recognize that various optimizations can be made. These optimizations can be used to determine a best solution $\phi((\rho)$ starting with basic overall specifications for the EDoF lens, optimization criteria, and a starting form for a family of focal lengths $f(\rho)$.

Another embodiment of the invention is directed to a method for designing a rotationally symmetric, aspheric EDoF lens from the specification of its focal length versus radius, $f(\rho)$, rather than by its phase delay function $\phi(\rho)$. There are various advantages associated with such a method including, but not limited to: the relative ease in generating a specific range of focal lengths based on simple geometrical optics equations relating to the desired range of operation; the ability to modify a specific lens design to meet a new requirement, e.g., improve an existing lens to work better close-in so that it can record business cards, inventory labels, and the like; and, the capability to improve an existing lens so that the image quality at larger distances or elsewhere is enhanced; i.e., in sum, tailoring the EDoF lens.

Various embodiments of the invention use three criteria when tailoring an existing EDoF lens such as: 1) Strehl ratio—a larger Strehl ratio indicates better image quality; 2) PSF width invariance—the invariance of the width of the point spread function along the optical axis can provide a fairly accurate measure of the performance of the digital processing to remove the purposeful blur caused by the EDoF lens; and 3) PSF narrowness—the narrowness of the FWHM of the PSF can provide a fairly accurate measure of the resolution of the optical system.

Figure 6:
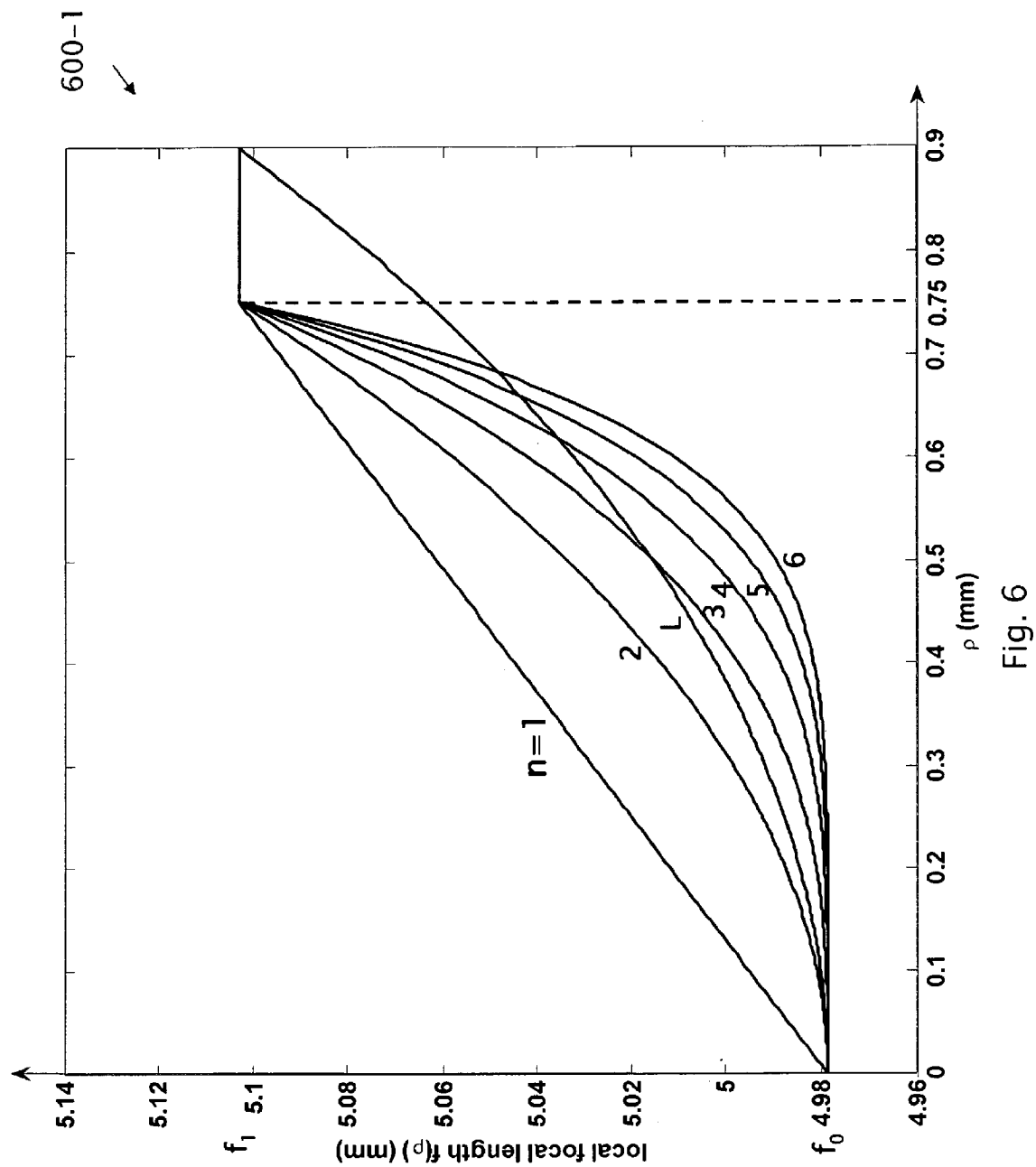
FIG. 6 shows a comparative graph of $n^{th}$-order polynomial curves representing a family of EDoF aspheric lenses according to certain aspects of an embodiment of the invention and a prior art EDoF β-logarithmic aspheric lens.

In one embodiment, a camera system that incorporates an EDoF lens provides imagery from an inner distance $s_1=204.5$ mm to an outer distance $s_2$ equal to infinity. The lens is specified to have f/2.8 and a diameter D equal to 1.8 mm. A curve of $f(\rho)$ versus $\rho$ for a prior art logarithmic asphere is shown as the L curve in the graph 600-1 in FIG. 6. FIG. 6 further shows a family of $n^{th}$-degree polynomial-based curves (n=1 to 6) that represent a family of aspherical EDoF lenses according to various embodiments of the invention. The focal length of these $n^{th}$-degree polynomial lenses is described by the following equation:

$$f(\rho) = a + b\rho^n, \quad (17)$$

where the constants a, b can be expressed in terms of the smallest focal length $f_0$ and the largest focal length $f_1$. The resultant family of $n^{th}$-degree polynomial aspheric lenses can be described by:

$$f(\rho) = f_0 + \frac{f_1 - f_0}{\rho_1^n}\rho^n, \quad (18)$$

where n ranges from 1 to 6, including non-integer values.

A reasonable set of values for the focal lengths can be calculated from the specifications using simple geometric optical formulas. For the lens specification:

$$s_1=204.5 \text{ mm}, s_2=\infty f/2.8, D=1.8 \text{ mm}, \quad (19)$$

the focal length is determined as f=5.040 mm. For the inner focus distance $s_1$, the EDoF equations can be obtained by extending the classical Rayleigh criterion with an improvement factor M, as follows:

$$\frac{1}{s_0} - \frac{1}{s_2} = \frac{M2\lambda}{D^2}, \quad (20)$$

$$\frac{1}{s_1} - \frac{1}{s_0} = \frac{M2\lambda}{D^2}, \quad (21)$$

where FIG. 1 shows the inner and outer distances $s_1$, $s_2$, respectively. Letting $s_2=\infty$ and eliminating $s_0$, gives the basic result for $s_1$:

$$\frac{1}{s_1} = \frac{M4\lambda}{D^2} \quad (22)$$

For an inner distance $s_1=204.5$ mm; D=1.8 mm, and $\lambda=0.55$ μm, Eq. (22) gives a predicted improvement factor for EDoF of M=7.2. Optimization can provide values for M up to 10 to 12.

At this point, the detector distance t is determined to be 5.103 mm as shown in FIG. 1. The calculated smaller focal length value $f_0$ in Eq. (18) equals 4.979 mm. The calculated larger focal length value $f_1$ in Eq. (18) equals 5.103 mm. Using these values and the description connecting $f(\rho)$ and $\phi((\rho)$ set forth above, a curve $\phi((\rho)$ for each value of n can be calculated, as further illustrated below.

It will be appreciated that the simple polynomial designs can be readily further optimized. The procedure can also be facilitated using digital computers and standard optimization methods. Careful study of the value of the slope $\phi'(\rho)$ at the distances where further tailoring is suggested can be used in the optimization process, for example.

As shown above and with reference to Tables 1-2, 2-2 in FIG. 2, an n=2, parabolic shape of $f(\rho)$ vs. $\rho$ provided excellent EDoF response. Similarly, the Tables 1-7 and 1-8 of FIGS. 7 and 8, respectively, show comparative performance of the tailored EDoF designs for n=2, 3, 4 for Strehl ratios and PSF-FWHM at different object distances. The designs follow the process detailed above. These results indicate that adequate EDoF performance is obtained for the simple polynomial cases n=2, 3, 4, which, in general, are better than the prior art logarithmic asphere lens at close distances.

Figure 9:
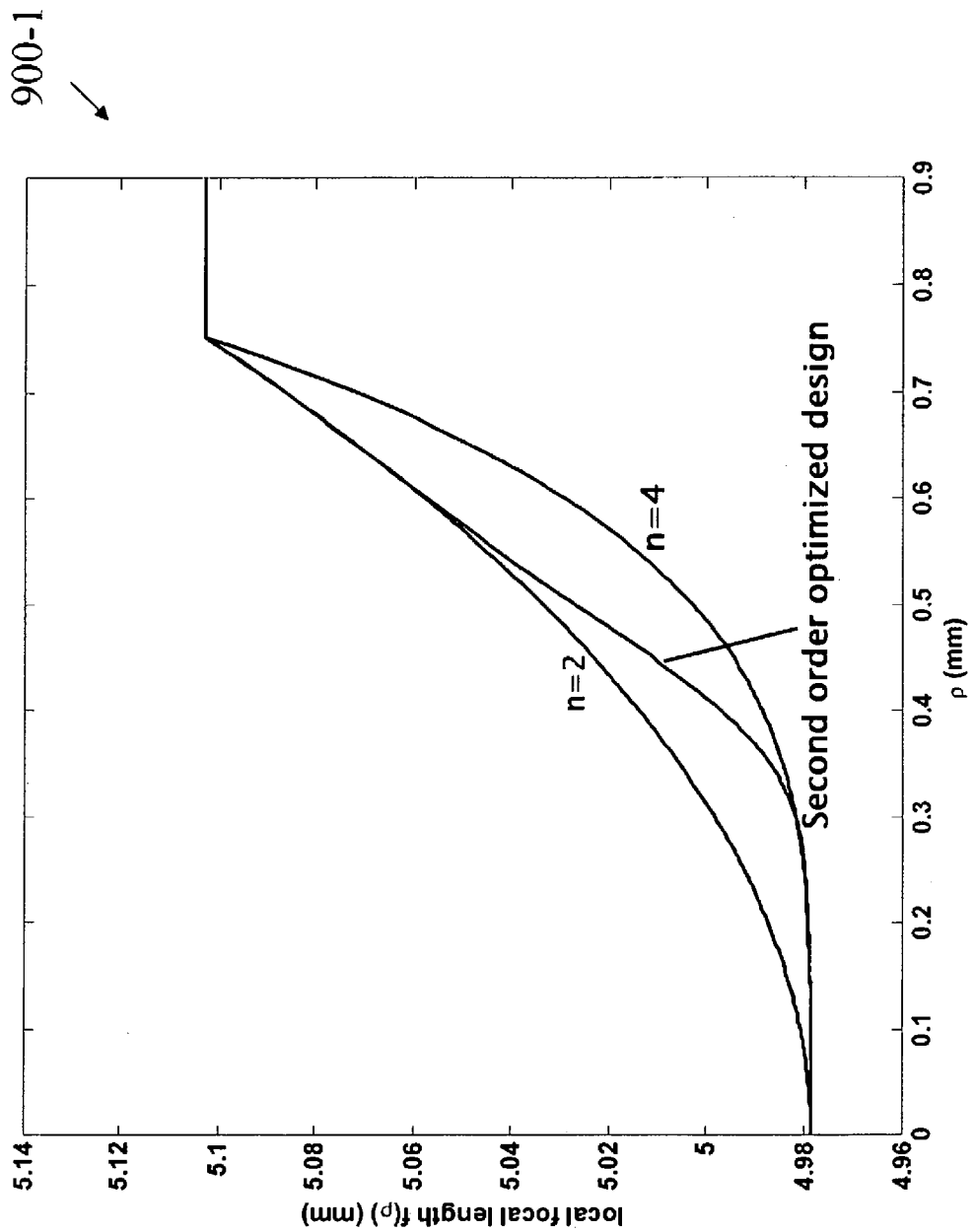
FIG. 9 shows a graph of curves of focal length versus lens radius for n=2, 4 tailored EDoF designs and a hyper-optimized EDoF design according to certain aspects of an embodiment of the invention.

An embodiment of the invention is directed to a method for 'hyper-optimizing' an EDoF lens design; i.e., performing a second-order-, or hyper-optimization on the 'tailored' designs as described above. For the second-order or hyper-optimization, a more complicated polynomial approximation can be used to further tailor the previous designs. According to one aspect, the Strehl ratio can be maximized using the data in Table 1-7 of FIG. 7. As shown therein, the Strehl ratio for n=4 is superior out to 300 mm, while the n=2 values are better for axial distances above 650 mm. Thus, with reference to the graph 900-1 in FIG. 9, a new curve 920 for $f(\rho)$ can be drawn following the n=4 curve out to $\rho=0.3$ mm and then smoothly joined with the n=2 curve at ρ=0.6 mm and above. The polynomial for f(ρ) of curve 920 is given by:

$$f(\rho) = 2073.27\rho^{10} - 7606.74\rho^9 + 11632.56\rho^8 - \\ 9568.84\rho^7 + 4563.12\rho^6 + \ldots - 1272.79\rho^5 + \\ 201.77\rho^4 - 16.69\rho^3 + 0.60\rho^2 - 0.0055\rho + 4.9786.$$ (23)

By Eq. (13), the phase delay for the second-order tailoring is given from Eq. (23) as follows:

$$\phi(\rho) = 35.862\rho^8 - 38.728\rho^6 - 26.883\rho^4 + 1149.6\rho^2.$$ (24)

The Tables 1-10, 2-10 in FIG. 10 show that the Strehl ratio is improved compared to the n=2 case for objects closer than 300 mm and is better than the n=4 case for object distances from 650 mm to infinity. The PSF is generally uniform and narrow for object distances from 204 mm to infinity.

With further reference to FIG. 4, the design layout 410 of the tailored parabolic EDoF lens described by the function φ(ρ) of Eq. 16 is illustrated. Such a design could be completed by an optical system designer using the popular ZEMAX® or CODE V® optical system design programs.

The tailored parabolic lens system 410 as shown in FIG. 4 includes four elements and one IR filter. A stop is located at the rear surface of the first lens element. The lens system has f/#=2.8, entrance pupil diameter D=1.8 mm, and effective focal length f=5.04 mm. The field of view is 46 degrees. This tailored parabolic EDoF lens has a small amount of axial color, 2.5 μm for spectrum from 0.466 μm to 0.620 μm, and low (0.875%) distortion. The detailed lens data are shown in FIGS. 11(*a*) and 11(*b*). The comparisons between the Strehl ratio and FWHM of the PSF for a standard diffraction limited actual lens with four elements and one IR filter, a corresponding prior art EDoF β-logarithmic asphere lens, and a corresponding tailored parabolic EDoF lens are shown in the Tables 1-12, 2-12 in FIG. 12. The actual standard diffraction limited lens focuses at a 2500 mm object distance. The Strehl ratio is as high as 0.98. FIG. 12 shows that the depth-of-field of the standard lens is small. The Strehl ratio drops very fast versus object distance. The β-logarithmic asphere lens extends the depth-of-field to a range of 204.5 mm to infinity. The tailored parabolic EDoF lens according to an embodiment of the invention has increased performance in comparison to the logarithmic asphere lens in terms of the FWHM of the PSF over most of the range of 100 mm to infinity. The tailored parabolic EDoF lens also has increased performance over the logarithmic asphere lens in terms of the Strehl ratio everywhere from 100 mm to infinity except at 900 mm, but even there the difference is minor. It should be noted that the performance of the prior discussed embodiments for lenses is very close to the earlier theoretical calculations.

According to one aspect of an embodiment, a method is directed to tailoring a prior art EDoF logarithmic asphere having a centrally obscured aperture. The illustrative method includes the following steps:

1. Designing a diffraction-limited (or perfect) lens, $\phi_F(\rho)$, with the proper f/# and diameter D;
2. Computing the total phase delay for the logarithmic lens $\phi_L(\rho)$ (including the prior art Log-asphere β or Log-asphere γ designs);
3. Computing a phase mask $\phi_E(\rho)$ sufficient to provide EDoF, such that $\phi_L(\rho) = \phi_F(\rho) + \phi_E(\rho)$;

4. Using the $\phi_L(\rho)$ and Eq. (2) above, calculating the corresponding f(ρ) for the logarithmic asphere, as well as the FWHM of the PSF and the PSF vs. distance along the optical axis;
5. Modifying f(ρ) to tailor the response. In doing this, it can also be advantageous to decrease the slope of f(ρ) corresponding to values of ρ for which the image needs to be improved. This may be effective since it increases the energy passing through the selected ρ for which that portion of the object is sharply focused;
6. Modifying f(ρ) to tailor the response using optimization methods and iterative calculations that are based on the criteria set forth above; and
7. Using the result in Eq's. (5), (6) to determine the tailored lens function $\phi_T(\rho)$.

The following example will further illustrate this process. The overall lens specifications remain as: D=1.8 mm, f/2.8, $s_1$=204.5 mm, and $s_2$=infinity. Following steps 1-3 outlined immediately above, a person skilled in the art can determine $$\phi_{Logaspher\beta}(\rho) = 1147.3\rho^2 - 28.2554\rho^4 + 0.4303\rho^6 - 0.0089\rho^8 \text{(radians)}.$$ (25)

Figure 13:
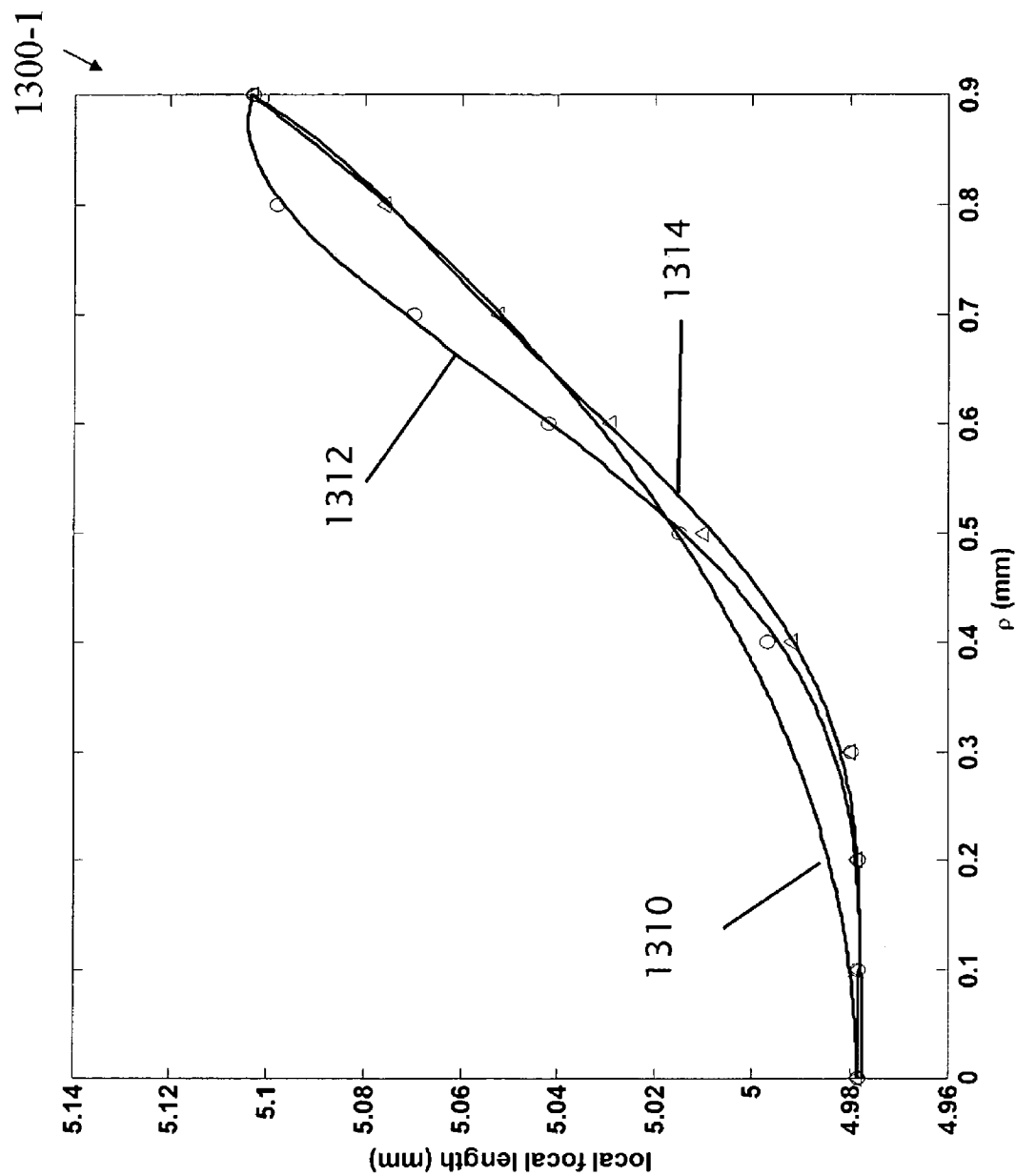
FIG. 13 shows a graph of curves of focal length versus lens radius for a prior art EDoF β-Logarithmic asphere and two optimization designs according to certain aspects of an embodiment of the invention.

Using Eq. (25) in Eq. (2), one can determine the focal length f(ρ) vs. ρ for this lens, shown as curve 1310 in FIG. 13. Following step 5 as described herein above, curves 1312 (tailored I) and 1314 (tailored II) represent two possible tailored versions for the improved aspheric lens. It is anticipated that both of these design can provide increased close-in performance. From Eq. (13) for finding the phase delay from the focal length, the total phase delay functions can be calculated for the two new lens designs. The resulting equations are as follows:

$$\phi_{TailoredI}(\rho) = 1148.1\rho^2 - 17.5938\rho^4 - 40.9461\rho^6 + 30.2619\rho^8 \text{(radians)}$$ (26)

$$\phi_{TailoredII}(\rho) = 1148.7\rho^2 - 22.0359\rho^4 - 19.4152\rho^6 + 14.0623\rho^8 \text{(radians)}.$$ (27)

Figure 14:
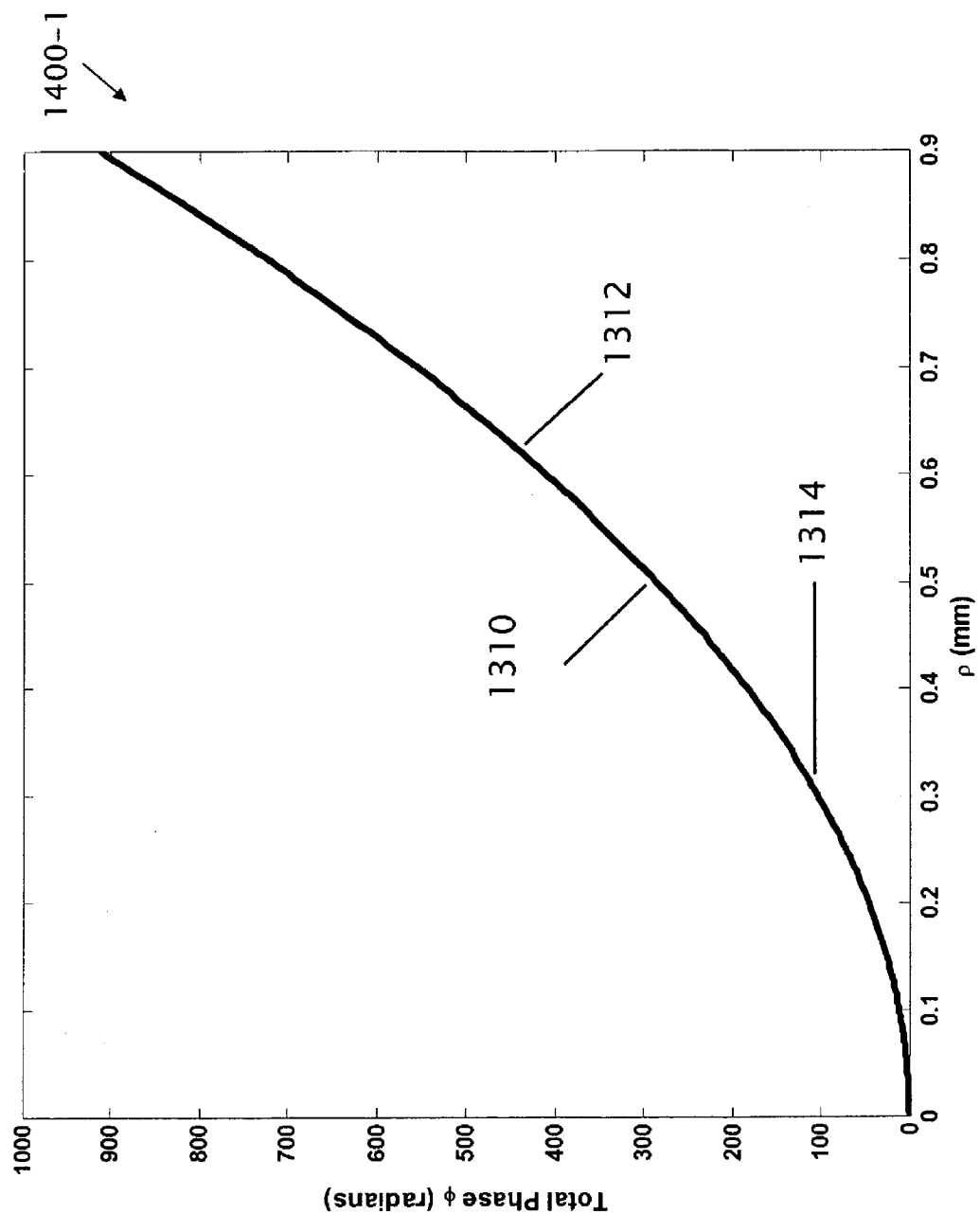
FIG. 14 shows a graph of total phase delay $\phi(\rho)$ vs. lens radius of three overlaid curves of the prior art EDoF β-Logarithmic asphere and the two embodied optimization designs depicted in FIG. 13.

These new curves for phase delay are also plotted in graph 1400-1 of FIG. 14, however it is difficult to see the departures on the scale of the curves given. This result does illustrate, however, that it is hardly possible or practical to tailor the designs of these aspheres by simply resketching on the plots of total phase delay. But, since the three lenses are specified by the total phase delays as given in Eqs. (25), (26), (27), it is possible to both compute their performance and/or design their lens layout. The Tables 1-15, 2-15 in FIG. 15 show comparative performance results in terms of the Strehl ratio and the PSF-FWHM for the three designs. Object distances from 100 mm to infinity are shown, although the design specification is for an inside distance of 204.5 mm.

Recalling that a higher Strehl ratio indicates better image quality, the Tables show that both of the tailored lenses are as good or improved over the prior art log asphere from 100 mm to 650 mm. Only at 900 mm does the log lens show better performance; however, the Strehl ratios of 0.258 and 0.340 are sufficient for restoration by digital processing.

For the full-width-half-maximum of the point spread function, uniformity as well as thinness both indicate improved performance. Performance of all three designs is good above 204 mm; however, the tailored design I shows a larger improvement than the others.

In another embodiment, a method is directed to tailoring a prior art (Log-Asphere γ) lens design. The three equations for the overall lens phase delays are given by $$\phi_{Logsper\gamma}(\rho)=1119.4\rho^2+6.7614\rho^4-0.0178\rho^6-0.000569\rho^8 \text{(radians)} \quad (28)$$

$$\phi_{TailoredI}(\rho)=1120.1\rho^2-1.7961\rho^4+25.8703\rho^6-17.4082\rho^8 \text{(radians)} \quad (29)$$

$$\phi_{TailoredII}(\rho)=1119.4\rho^2-2.1516\rho^4+30.1008\rho^6-21.1628\rho^8 \text{(radians)}. \quad (30)$$

Figure 16:
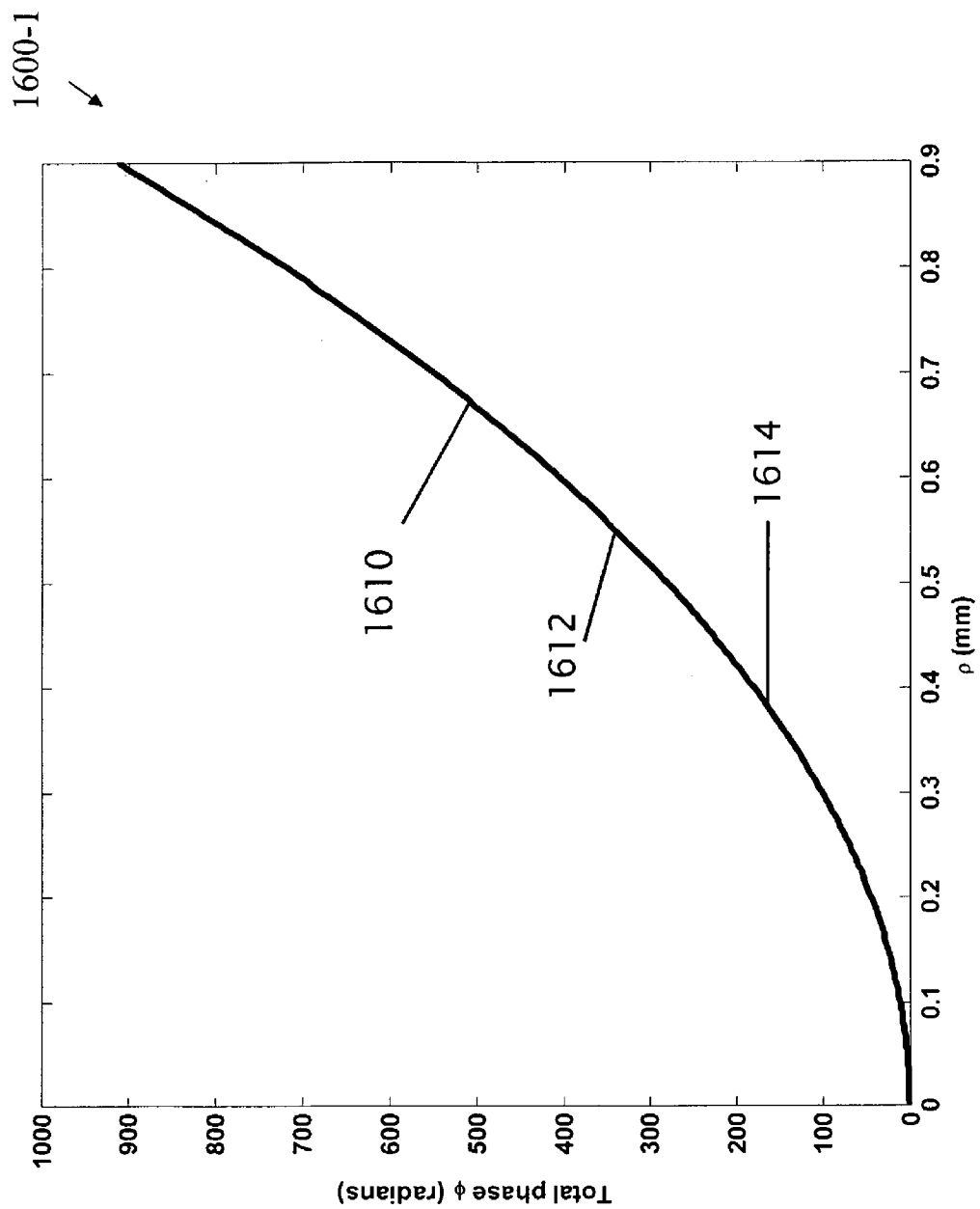
FIG. 16 shows a graph of total phase delay $\phi(\rho)$ vs. lens radius of three overlaid curves for a prior art EDoF γ-Logarithmic asphere and two optimization designs according to certain aspects of an embodiment of the invention.
Figure 17:
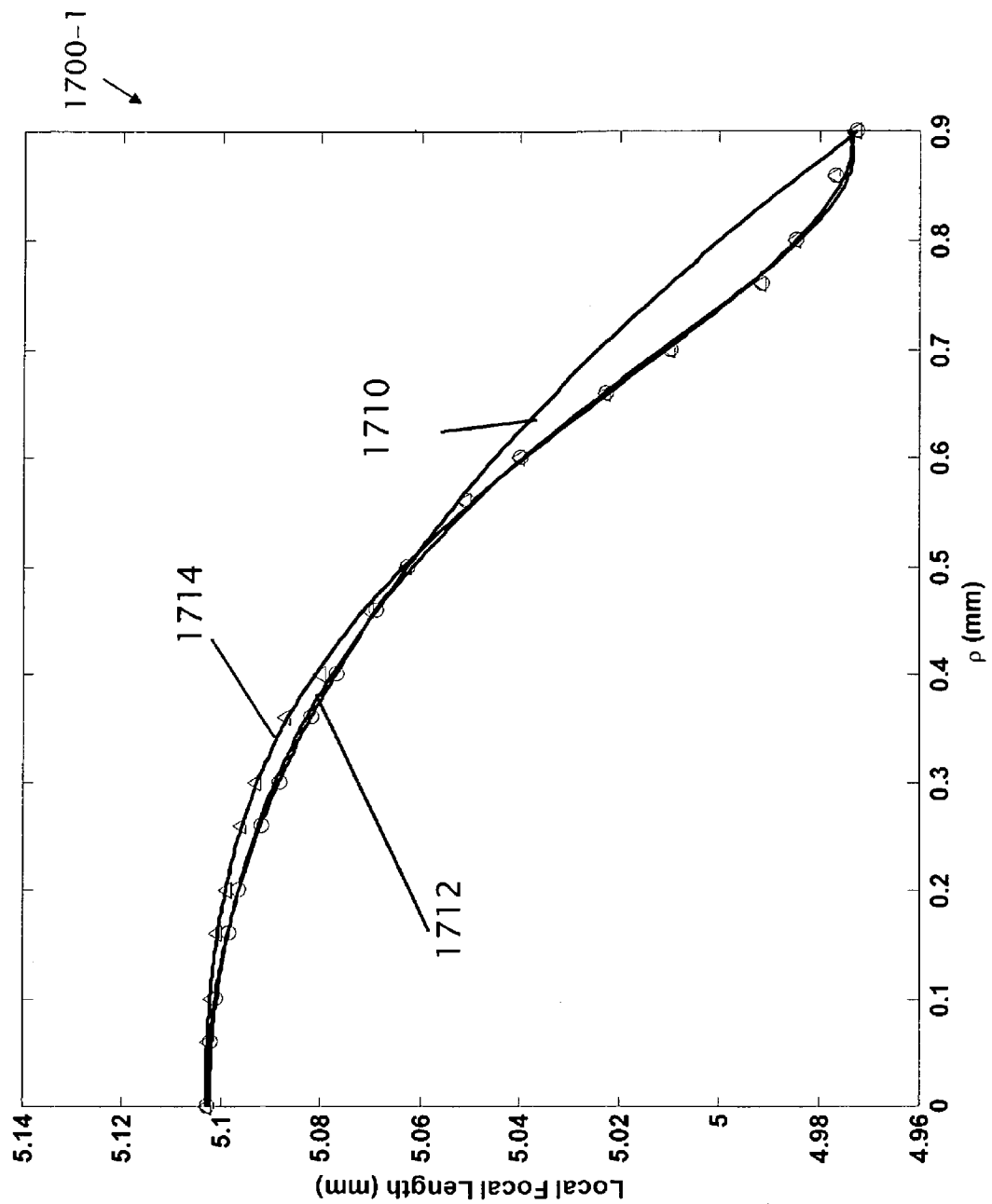
FIG. 17 shows a graph of curves of focal length versus lens radius for a prior art EDoF γ-Logarithmic asphere and two optimization designs according to certain aspects of an embodiment of the invention.

The phase delays for the γ design and tailored versions I & II are shown by the overlaid curves in FIG. 16. Respective curves 1710, 1712, 1714 of the radially varying focal lengths f(ρ) vs. ρ are shown in FIG. 17. The Tables 1-18, 2-18 of comparative performance are shown in FIG. 18.

From FIG. 17 for the focal lengths, the tailoring I curve 1712 with low slope at short focal lengths is chosen to improve the close-in performance with the tailoring II curve 1714 to improve the region around 900 mm. Overall the tailoring I curve provides the most benefit for a particular lens design.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. A method for making an aspheric lens, comprising:
   a) selecting a radially varying focal length value f(ρ) for the lens, where ρ is the lens radius; and
   determining a corresponding radially varying phase delay function φ(ρ); and
   relating f(ρ) and φ(ρ) via the expression $$\varphi(\rho) = \int_0^\rho \frac{-k\rho}{[f^2(\rho_1)+\rho_1^2]^{1/2}} d\rho_1,$$

where $\rho_1$ is the variable of integration running from zero to ρ and k is a constant.

2. The method of claim 1, further comprising fabricating the lens.

3. The method of claim 1, further comprising modifying a performance metric of the lens as a function of f(ρ).

4. The method of claim 3, further comprising modifying a Strehl ratio of the lens.

5. The method of claim 3, further comprising modifying a Point Spread Function of the lens.

6. The method of claim 1, further comprising modifying a depth-of-field value of the lens as a function of f(ρ).

7. The method of claim 1, further comprising determining an extended depth-of-field of the lens by selecting an inner object distance $s_1$ and an outer object distance $s_2$.

8. The method of claim 1, further comprising determining a polynomial representation of f(ρ) and obtaining a curve of f versus ρ over a desired range of ρ.

9. The method of claim 8, further comprising modifying a portion of the curve to provide improved lens performance over a desired object distance sub-range and determining a corresponding modified polynomial representation of f(ρ).

10. The method of claim 9, further comprising modifying a portion of the curve to provide improved lens performance over a desired object distance sub-range and determining a corresponding modified polynomial representation of $f(\rho)_{mod}$.

11. The method of claim 10, further comprising determining a modified phase delay function $\phi(\rho)_{mod}$ of the lens from the modified focal length $f(\rho)_{mod}$.

12. The method of claim 11, wherein $$\varphi(\rho)_{mod} = \int_0^\rho \frac{-k\rho}{[f^2(\rho_1)_{mod}+\rho_1^2]^{1/2}} d\rho_1,$$

where $\rho_1$ is the variable of integration running from zero to ρ.

13. The method of claim 1, comprising making a rotationally symmetric, aspheric lens having an extended depth of field.

14. A method for optimizing the design of a rotationally symmetric, aspheric, extended depth of field (EDoF) lens specified by a known phase delay function $\phi_L(\rho)$, where ρ is the lens radius, comprising:
   determining a value of the radially-varying focal length $f_L(\rho)$ of the lens from the known phase delay function $\phi_L(\rho)$, wherein said lens has a given range of focal lengths over the range of ρ;
   determining a new value of a radially-varying focal length $f_{new}(\rho)$ of the lens that is different than $f_L(\rho)$, wherein $f_{new}(\rho)$ incorporates the given range of focal lengths over a range of $\rho_{new}$, where $\rho_{new}$ is less than ρ; and
   determining a new value of a phase delay function $\phi_{new}(\rho_{new})$.

15. The method of claim 14, wherein the value of $f_{new}(\rho)$ is constant over a range between about $0.8\rho \leq \rho_{new} < \rho$.

16. The method of claim 14, further comprising expressing $f_{new}(\rho)$ as a curve that can be approximated by an $n^{th}$-order polynomial, where $1 \leq n \leq 6$ including non-integer values.

17. The method of claim 16, wherein the curve is a parabola.

18. The method of claim 16, further comprising hyper-optimizing the optimized design, comprising:
   generating a plurality of curves based on at least two different values of n;
   determining a value of a lens performance metric over a desired range of object distances for each of the curves;
   selecting the values of the lens performance metrics for two of the curves;
   selecting a better range of performance metric values for a corresponding range of object distances over a radial portion $\rho_1$ of a first one of the two curves and selecting a better range of performance metric values for a corresponding range of different object distances over a radial portion $\rho_2$ of a second one of the two curves;
   generating a new curve $f_{new-hyper}(\rho)$ that includes the radial portions of the first and the second curves and, which, smoothly connects the first curve at $\rho_1$ to the second curve at $\rho_2$;
   determining a polynomial expression for the new, hyper-optimized function $f_{new-hyper}(\rho)$; and
   directly determining a hyper-optimized phase delay function $\phi_{hyper}(\rho)$ as a function of the lens radius ρ.

19. The method of claim 18, wherein $$\varphi_{hyper}(\rho) = \int_0^\rho \frac{-k\rho}{\left[f_{new\text{-}hyper}(\rho_1) + \rho_1^2\right]^{1/2}} d\rho_1,$$

where $\rho_1$ is the variable of integration running from zero to $\rho$.

20. A method for designing an aspheric lens that includes a diffraction limited lens and a phase mask, having an extended depth of field (EDoF), comprising:
   determining a phase delay function $\phi_P(\rho)$ of the diffraction limited lens, where $\rho$ is the lens radius;
   determining a total phase delay function $\phi_L(\rho)$ of the EDoF lens;
   determining a phase delay function $\phi_E(\rho)$ of the phase mask to provide a desired EDoF, where $\phi_L(\rho)=\phi_P(\rho)+\phi_E(\rho)$;
   determining a radially-varying focal length function $f_L(\rho)$ of the EDoF lens from the function $\phi_L(\rho)$;
   determining a value of a lens performance metric for the EDoF lens;
   modifying $f_L(\rho)$ so as to tailor the design to improve the performance metric; and
   determining a tailored phase delay function $\phi_T(\rho)$.

21. The method of claim 20, further comprising recalculating the value of the lens performance metric for the tailored EDoF lens.

22. The method of claim 21, further comprising modifying the tailored f ($\rho$) value to further tailor the lens performance.

23. The method of claim 22, further comprising recalculating the value of the lens performance metric for the furthered tailored EDoF lens.

24. The method of claim 20, wherein determining $f_L(\rho)$ comprises determining a polynomial representation of $f_L(\rho)$ and obtaining a curve of $f_L$ versus $\rho$ for a desired range of $\rho$.

25. The method of claim 24, further comprising modifying a portion of the curve to provide improved lens performance over a desired object distance sub-range and determining a corresponding modified polynomial representation of $f_L(\rho)$.

26. The method of claim 25, further comprising determining a modified phase delay function $\phi_L(\rho)$ of the lens from the modified focal length $f_L(\rho)$.

27. The method of claim 24, wherein the step of modifying $f_L(\rho)$ so as to tailor the design to improve the performance metric comprises decreasing the slope of the curve of $f_L(\rho)$ corresponding to values of $\rho$ over which improved performance is desired.

* * * * *